(12) United States Patent
Jacobson

(10) Patent No.: US 6,908,052 B1
(45) Date of Patent: Jun. 21, 2005

(54) LAWN MOWER SPRAYER ASSEMBLY

(76) Inventor: Earl Jacobson, P.O. Box 761, Tea, SD (US) 57064

( * ) Notice: Subject to any disclaimer, the term of this patent is extended or adjusted under 35 U.S.C. 154(b) by 18 days.

(21) Appl. No.: 10/713,756

(22) Filed: Nov. 14, 2003

(51) Int. Cl.[7] .............................. B05B 3/00; B05B 3/18; B05B 9/03; A01G 25/09; E01C 19/16
(52) U.S. Cl. ....................... 239/722; 239/146; 239/172; 239/289; 239/754; 239/DIG. 6
(58) Field of Search ............................. 239/130, 146, 239/172, 176, 289, 722, 754, DIG. 6

(56) References Cited

U.S. PATENT DOCUMENTS

| | | | |
|---|---|---|---|
| 2,044,884 A | 6/1936 | Keller | |
| 2,759,292 A * | 8/1956 | Whipple et al. | ............... 43/129 |
| 2,939,636 A | 6/1960 | Mullin | |
| 3,140,574 A * | 7/1964 | Brown, Jr. | ............. 239/DIG. 6 |
| 3,151,563 A | 10/1964 | Lita et al. | |
| 3,338,524 A * | 8/1967 | Rhein et al. | ........... 239/DIG. 6 |
| 3,534,533 A * | 10/1970 | Luoma | .................. 239/DIG. 6 |
| 3,595,481 A * | 7/1971 | Enblom | ................. 239/DIG. 6 |
| 3,722,820 A | 3/1973 | Klint, Jr. | |
| 3,797,743 A | 3/1974 | Kommers et al. | |
| 3,857,515 A | 12/1974 | Zennie | |
| 4,242,855 A | 1/1981 | Beaver, Jr. | |
| 4,602,742 A | 7/1986 | Penson | |
| 4,821,959 A | 4/1989 | Browning | |
| 5,088,232 A | 2/1992 | Aurness et al. | |
| 5,109,629 A | 5/1992 | King, Jr. et al. | |
| 5,222,666 A * | 6/1993 | Gnutel | .................. 239/DIG. 6 |
| 6,145,288 A * | 11/2000 | Tamian et al. | ............... 56/16.8 |
| 6,497,088 B1 | 12/2002 | Holley | |

* cited by examiner

Primary Examiner—David A. Scherbel
Assistant Examiner—Darren Gorman
(74) Attorney, Agent, or Firm—Leonard & Proehl, Prof. L.L.C.

(57) ABSTRACT

A lawn mower sprayer assembly for spraying a fluid onto a lawn during mowing of the lawn. The lawn mower sprayer assembly includes a container member being designed for receiving the fluid. The container member is designed for being coupled to a lawn mower. A pressurizing assembly is operationally coupled to the container member. The pressurizing assembly is for pressurizing the container member whereby the container member is designed for storing the fluid in a pressurized state when the pressurizing assembly is actuated by a user. A delivery assembly is operationally coupled to the container member whereby the delivery assembly is designed for being in fluid communication with the fluid in the container member. The delivery assembly is designed for receiving the fluid under pressure and distributing the fluid onto the lawn.

9 Claims, 4 Drawing Sheets

LAWN MOWER SPRAYER ASSEMBLY

BACKGROUND OF THE INVENTION

1. Field of the Invention

The present invention relates to fertilizing attachments and more particularly pertains to a new lawn mower sprayer assembly for spraying a fluid onto a lawn during mowing of the lawn.

2. Description of the Prior Art

The use of fertilizing attachments is known in the prior art. U.S. Pat. No. 3,722,820 describes a device for being coupled to the exhaust of a lawn mower to spray fluid onto the lawn. Another type of fertilizing attachment is U.S. Pat. No. 2,939,636 having a attachment that is coupled to a lawn mower above the blades of the lawn mower to spray fluid onto the lawn as the lawn is being cut. U.S. Pat. No. 5,109,629 has an apparatus coupled to the exhaust of the lawn mower where the apparatus vaporizes the insecticide that is to be injected into the ground to exterminate subterranean insects. U.S. Pat. No. 6,497,088 has at least one nozzle positioned between a mower blade and a fan to spray a fluid onto the grass being cut by the mower blade. U.S. Pat. No. 4,821,959 has a pump that is directly connected to the drive train of the lawn mower and actuates to run the pump and spray fluid from a tank on the lawn. U.S. Pat. No. 4,602,742 has a spraying unit that is towed behind a vehicle to spray fluid onto the ground behind the unit. U.S. Pat. No. 5,088,232 has an applicator that applies a liquid to the base of the grass and has a sprayer for spraying the liquid onto shrubs. U.S. Pat. No. 4,242,855 has an edge trimmer that is connected by a flexible drive shaft to the motor of a lawn mower to provide an edge trimmer that is transported with the lawn mower and used to trim area where the grass can not be cut by the lawn mower. U.S. Pat. No. 2,044,884 has a pumping unit that is operationally coupled to the motor of a lawn mower and draws a fluid from a tank to be sprayed on the lawn. U.S. Pat. No. 3,797,743 has a tank coupled to a cart for spraying fluids onto the lawn as the cart is pushed by the user. U.S. Pat. No. 3,151,563 has an attachment that is coupled to the drive shaft of a lawn mower to run a pump for pump a fluid through a sprayer to be applied to the lawn. U.S. Pat. No. 3,857,515 has a device that is coupled to a deck of a lawn mower and extends outwardly from the side of the deck to spray fluids onto the lawn as the user is mowing the lawn.

While these devices fulfill their respective, particular objectives and requirements, the need remains for a system that has certain improved features that allows a user to easily disengage the system from a lawn mower.

SUMMARY OF THE INVENTION

The present invention meets the needs presented above by providing a container member, a pressurizing assembly and a delivery assembly that can be readily removed from the lawn mower when not in use by the user.

Still yet another object of the present invention is to provide a new lawn mower sprayer assembly that can be easily cleaned when the user has finished spraying the lawn.

Even still another object of the present invention is to provide a new lawn mower sprayer assembly that is independent of the lawn mower and does not require the lawn mower to spray the fluid onto the lawn.

To this end, the present invention generally comprises a container member being designed for receiving the fluid. The container member is designed for being coupled to a lawn mower. A pressurizing assembly is operationally coupled to the container member. The pressurizing assembly is for pressurizing the container member whereby the container member is designed for storing the fluid in a pressurized state when the pressurizing assembly is actuated by a user. A delivery assembly is operationally coupled to the container member whereby the delivery assembly is designed for being in fluid communication with the fluid in the container member. The delivery assembly is designed for receiving the fluid under pressure and distributing the fluid onto the lawn.

There has thus been outlined, rather broadly, the more important feature's of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
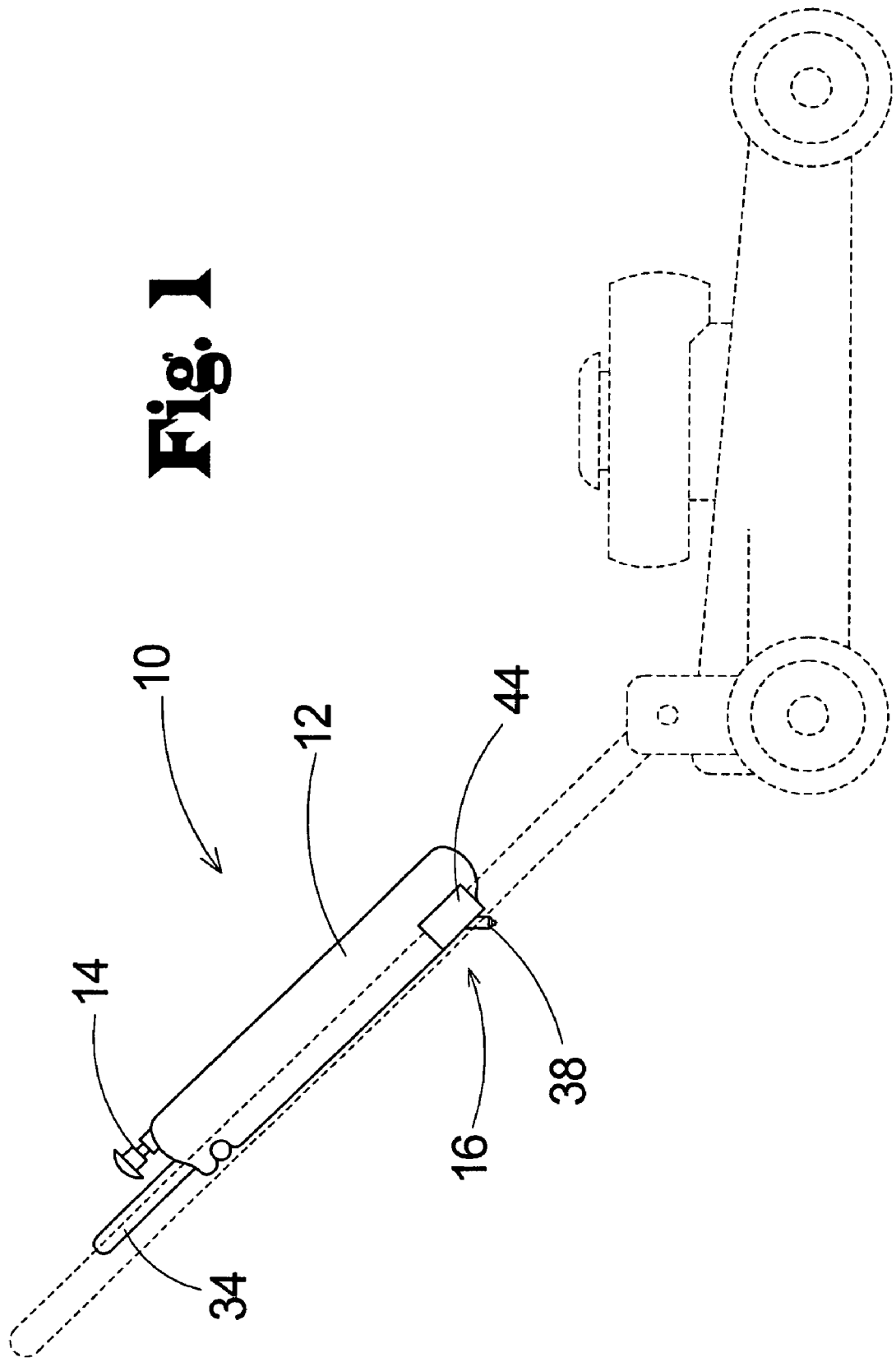
FIG. 1 is a side view of a new lawn mower sprayer assembly according to the present invention shown in use.
Figure 2:
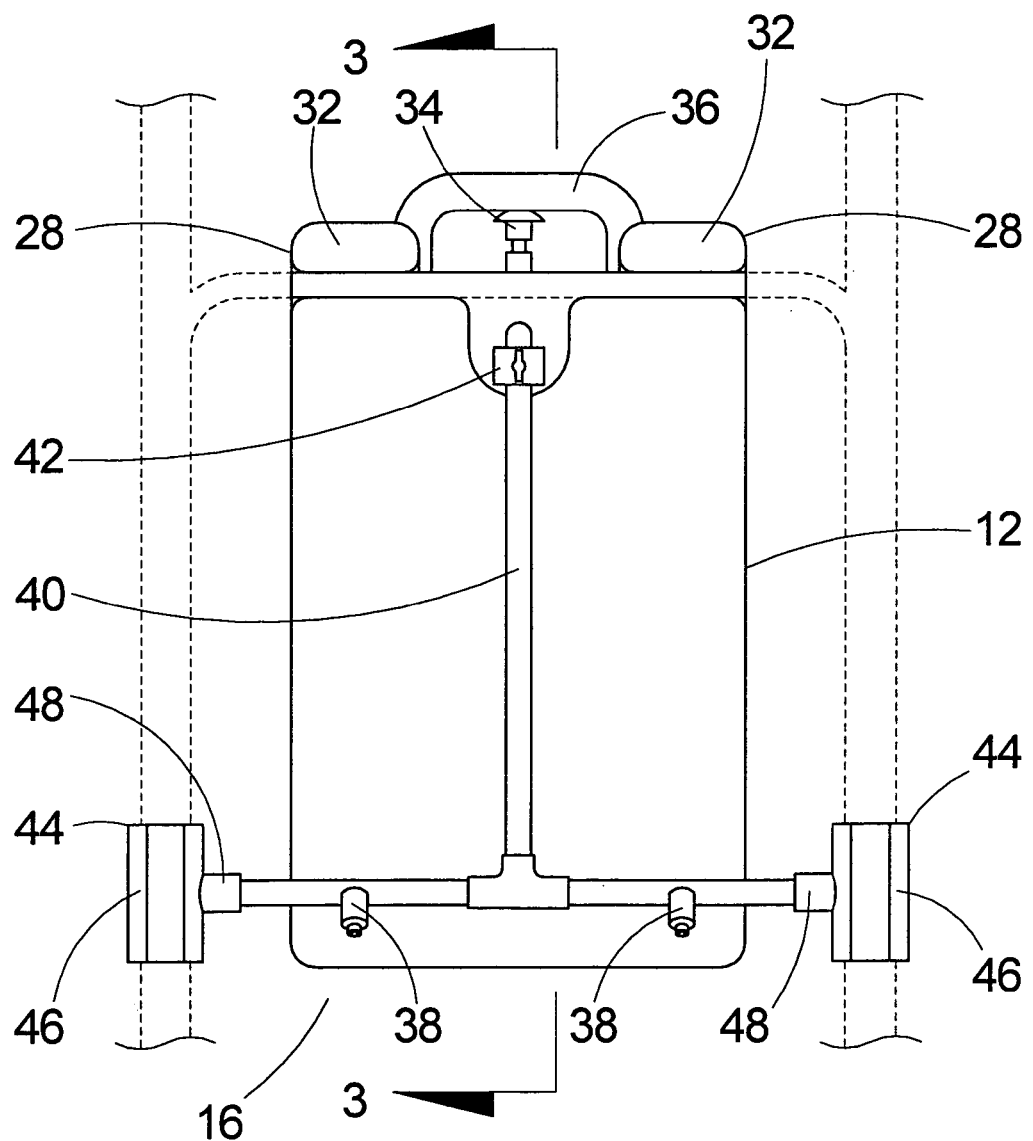
FIG. 2 is a bottom view of the present invention.
Figure 3:
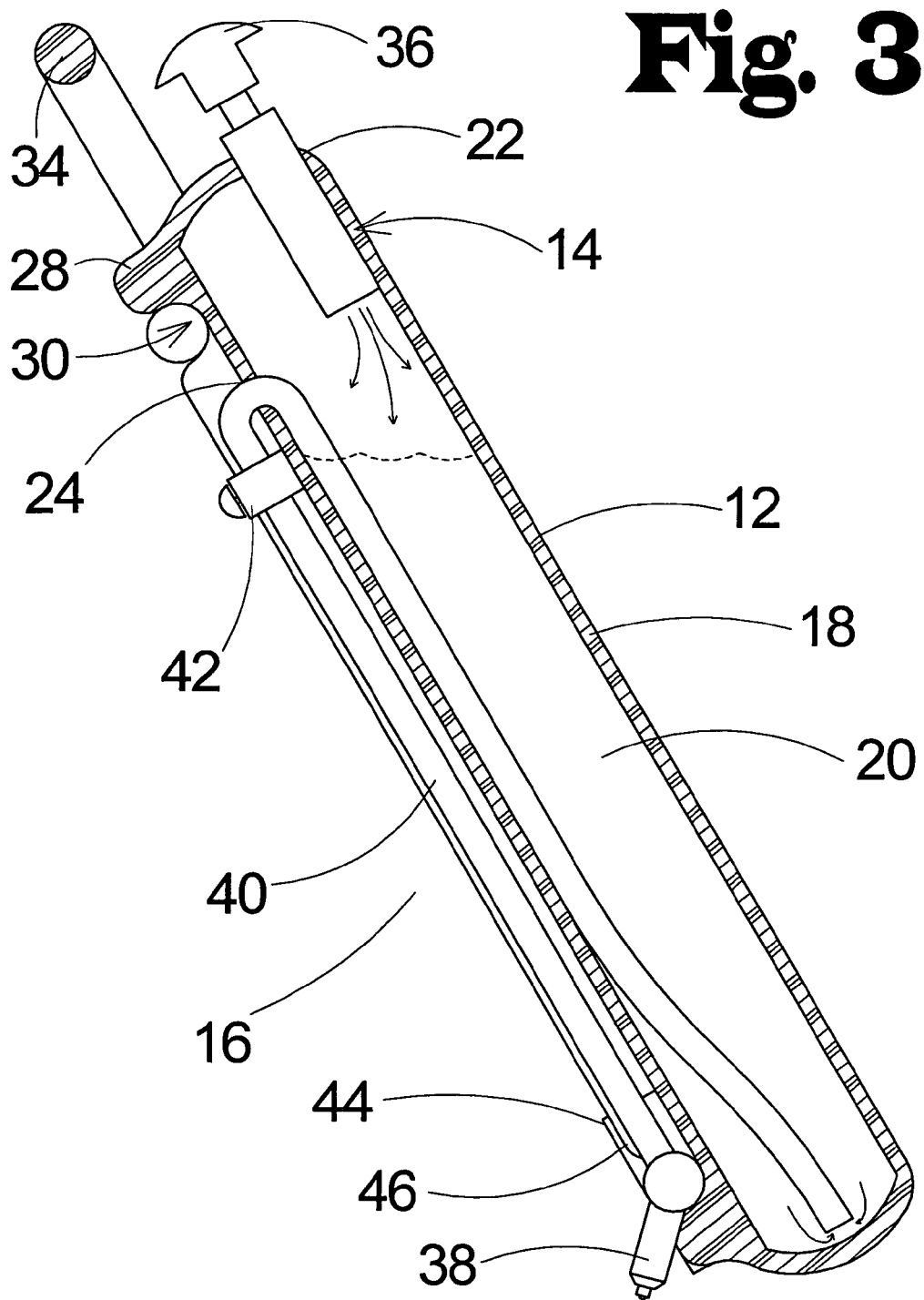
FIG. 3 is a cross-sectional view of the present invention taken along line 3—3 of FIG. 2.
Figure 4:
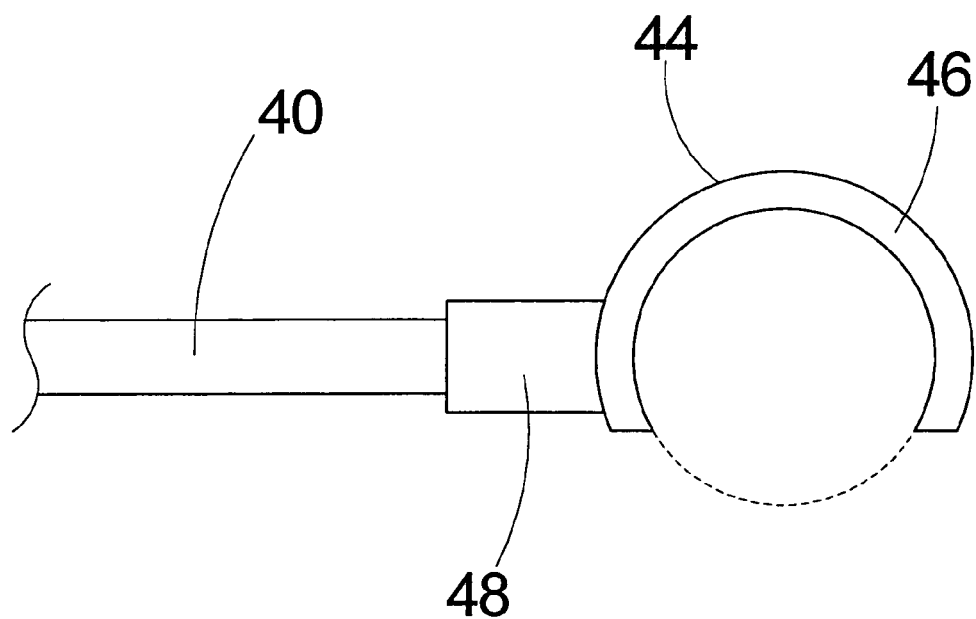
FIG. 4 is a front view of one of the clip members of the present invention.

With reference now to the drawings, and in particular to FIGS. 1 through 4 thereof, a new lawn mower sprayer assembly embodying the principles and concepts of the present invention and generally designated by the reference numeral 10 will be described.

As best illustrated in FIGS. 1 through 4, the lawn mower sprayer assembly 10 generally comprises a container member 12 being designed for receiving the fluid. The container member 12 is designed for being coupled to a lawn mower. A pressurizing assembly 14 is operationally coupled to the container member 12. The pressurizing assembly 14 is for pressurizing the container member 12 whereby the container member 12 is designed for storing the fluid in a pressurized state when the pressurizing assembly 14 is actuated by a user.

A delivery assembly 16 is operationally coupled to the container member 12 whereby the delivery assembly 16 is designed for being in fluid communication with the fluid in the container member 12. The delivery assembly 16 is designed for receiving the fluid under pressure and distributing the fluid onto the lawn.

The container member 12 comprises a perimeter wall 18. The perimeter wall 18 defines an interior space 20 of the container member 12. The interior space 20 of the container member 12 is designed for receiving the fluid whereby the container member 12 stores the fluid received by the interior space 20 of the container member 12. The pressurizing assembly 14 is coupled to the perimeter wall 18 of the container member 12 whereby the pressurizing assembly 14 is in fluid communication with the interior space 20 of the container member 12. The pressurizing assembly 14 is for pressurizing the interior space 20 of the container member 12.

The perimeter wall 18 of the container member 12 comprises an entrance aperture 22. The entrance aperture 22 extends through the perimeter wall 18 of the container member 12 whereby the entrance aperture 22 is in fluid communication with the interior space 20 of the container member 12. The entrance aperture 22 of the container member 12 is designed for permitting the fluid to be poured into the interior space 20 of the container member 12 through the entrance aperture 22. The pressurizing assembly 14 is selectively coupled to the perimeter wall 18 whereby the pressurizing assembly 14 is selectively positioned in the entrance aperture 22 of the container member 12 to inhibit the fluid from being inadvertently spilled from the interior space 20 of the container member 12.

The perimeter wall 18 of the container member 12 comprises an exiting aperture 24. The exiting aperture 24 extends through the perimeter wall 18 whereby the exiting aperture 24 is in fluid communication with the interior space 20 of the container member 12. The delivery assembly 16 is coupled to the perimeter wall 18 of the container member 12 whereby the delivery assembly 16 is positioned in the exiting aperture 24 of the container member 12 to permit fluid communication between the interior space 20 of the container member 12 and the delivery assembly 16.

A pair of tab members 28 are coupled to the container member 12. Each of the tab members 28 extends outwardly from the container member 12. The tab members 28 are designed for extending around a stabilizer bar of a handle of the lawn mower whereby the stabilizer bar is positioned between each of the tab members 28 and the container member 12 to allow the container member 12 to be selectively coupled to the lawn mower.

Each of the tab members 28 comprises a base portion 30 and an extension portion 32. The extension portion 32 is coupled to the base portion 30 of the associated one of the tab members 28 whereby the extension portion 32 is positioned substantially orthogonal to the base portion 30 of the associated one of the tab members 28. The base portion 30 of each of the tab members 28 is coupled to the container member 12 whereby the extension portion 32 of the associated one of the tab members 28 is positioned opposite the container member 12. The extension portion 32 of each of the tab members 28 is designed for being positioned on an opposite side of the stabilizer bar from the container member 12 whereby the stabilizer bar is pinched between the extension portion 32 of each of the tab members 28 and the container member 12 to selectively mount the container member 12 to the lawn mower.

A handle member 34 is coupled to the container member 12. The handle member 34 is designed for being selectively gripped by a hand of the user whereby the handle member 34 is for facilitating transportation of the container member 12 when the container member 12 is removed from the lawn mower.

A pump handle 36 is operationally coupled to the pressurizing assembly 14. The pump handle 36 is for actuating the pressurizing assembly 14 whereby the pressurizing assembly 14 pumps air into the interior space 20 of the container member 12 to pressurize the container member 12 when the pump handle 36 is actuated by the user.

The delivery assembly 16 comprises at least one nozzle member 38. The nozzle member 38 is operationally coupled to the container member 12 whereby the nozzle member 38 is in fluid communication with the interior space 20 of the container member 12. The nozzle member 38 is designed for spraying the fluid from the container member 12 onto the lawn when the container member 12 is pressurized by the pressurizing assembly 14.

The delivery assembly 16 comprises a conduit 40. The conduit 40 is operationally coupled between the nozzle member 38 and the container member 12. The conduit 40 is in fluid communication with the interior space 20 of the container member 12 and the nozzle member 38 of the delivery assembly 16 whereby the conduit 40 is designed for conducting the pressurized fluid from the interior space 20 of the container member 12 to the nozzle member 38 of the delivery assembly 16.

The delivery assembly 16 comprises a flow control member 42. The flow control member 42 is operationally coupled between the nozzle member 38 and the container member 12 whereby the flow control member 42 is in fluid communication between the container member 12 and the nozzle member 38. The flow control member 42 is designed for controlling the flow of pressurized fluid from the container member 12 to the nozzle member 38 when the flow control member 42 is actuated by the user.

A pair of clip members 44 are coupled to the conduit 40 of the delivery assembly 16. The clip members 44 are designed for selectively engaging side portions of the handle of the lawn mower whereby the clip members 44 are for selectively securing the container member 12 and the delivery assembly 16 to the lawn mower.

Each of the clip members 44 comprises a mounting portion 46 and coupling portion 48. The mounting portion 46 is coupled to the coupling portion 48 of the associated one of the clip members 44. The coupling portion 48 of each of the clip members 44 is coupled to the conduit 40 of the delivery assembly 16. The mounting portion 46 of each of the clip members 44 comprises a substantially arcuate cross-section whereby the mounting portion 46 of each of the clip members 44 is designed for extending around a portion of the side portion of the handle of the lawn mower to selectively secure the container member 12 and the delivery assembly 16 to the lawn mower.

In use, the user disengages the pressurizing assembly 14 from the perimeter wall 18 of the container member 12. The fluid to be sprayed on the lawn is poured into the interior space 20 of the container member 12 through the entrance aperture 22. The pressurizing assembly 14 is the replaced in the entrance aperture 22 to inhibit the fluid from spilling out of the container member 12. The container member 12 is then coupled to the handle member 34 by pressing the stabilizer bar of the handle between the container member 12 and the extension portion 32 of each of the tab members 28 and pressing the mounting portion 46 of each of the clip members 44 onto the side portions of the handle of the lawn mower to secure the container member 12 to the lawn mower. The pump handle 36 is then gripped by the user and actuated with respect to the pressurizing assembly 14 to actuate the pressurizing assembly 14 to pump air from the environment into the interior space 20 of the container member 12 to pressurize the fluid in the interior space 20 of the container member 12. The control member is then actuated by the user and the fluid is transferred from the interior space 20 of the container member 12 through the conduit 40 to the nozzle member 38 to be sprayed on the lawn as the user mows the lawn. The control member may be actuated again to discontinue flow from the container member 12 to the nozzle member 38. The pump handle 36 may have to actuated while the user is in the process of the mowing the lawn to pressurize the container member 12 as the container member 12 is depressurized when the fluid is sprayed from the nozzle member 38.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fluid spraying system for mounting on a lawn mower to spray fluid onto a lawn, the lawn mower being of the type having a deck and a handle assembly including a pair of arms extending rearwardly and upwardly from the deck and a cross member extending between the arms, the fluid spraying system comprising:
   a container defining an interior for receiving the fluid to be sprayed on the lawn, said container having an upper portion and a lower portion, said container having opposite ends;
   pressurizing means for pressurizing the interior of said container such that said container for applying pressure to fluid stored in the interior of said container; and
   a spray delivery assembly fluidly coupled to the interior of said container, said spray delivery assembly including:
      a spray conduit for extending between the arms of the handle assembly of the lawn mower, the spray conduit having opposite ends;
      a plurality of nozzles mounted on said spray conduit for spraying fluid from said container; and
      mounting means on opposite ends of said spray conduit for mounting the opposite ends of said spray conduit on the respective arms of the handle assembly to bridge said spray conduit between the arms of the handle assembly of the lawn mower.

2. The fluid spraying system of claim 1 wherein the mounting means comprises a clip member mounted on each of said ends of said spray conduit for clipping onto the arms of the handle assembly of the lawn mower.

3. The fluid spraying system of claim 2 wherein each of said clip members comprises a channel for receiving a portion of one of the arms of the handle assembly.

4. The fluid spraying system of claim 1 wherein said container has an exterior surface, the exterior surface forming a channel on the upper portion of said container configured to receive the cross member of the handle assembly of the lawn mower.

5. The fluid spraying system of claim 4 wherein said channel is located along an uppermost end of said container such that said container hangs generally downwardly from the cross member of the handle assembly when the cross member is positioned in said channel.

6. The fluid spraying system of claim 1 wherein the lower portion of said container rests against said spray conduit to support the lower portion of said container between the arms of the handle assembly of the lawn mower.

7. The fluid spraying system of claim 1 wherein said container defines a recess on the lower portion of said container, said recess receiving a portion of said spray conduit.

8. In combination:
   a lawn mower having a deck and a handle assembly including a pair of arms extending rearwardly and upwardly from said deck and a cross member extending between said arms; and
   a fluid spraying system mounted on said lawn mower to spray fluid onto a lawn, said fluid spraying system comprising:
      a container defining an interior for receiving the fluid to be sprayed on the lawn, said container having an upper portion and a lower portion, said container having opposite ends;
      pressurizing means for pressurizing the interior of said container such that said container for applying pressure to fluid stored in the interior of said container; and
      a spray delivery assembly fluidly coupled to the interior of said container, said spray delivery assembly including:
         a spray conduit extending between the arms of said handle assembly of said lawn mower, the spray conduit having opposite ends;
         a plurality of nozzles mounted on said spray conduit for spraying fluid from said container; and
         mounting means on opposite ends of said spray conduit to mount the opposite ends of said spray conduit on the respective said arms of said handle assembly to bridge said spray conduit between the arms of said handle assembly of said lawn mower.

9. The combination of claim 8 wherein said container is positioned between the arms of said handle assembly and generally below the cross member of said handle assembly of said lawn mower.

* * * * *